(12) United States Patent
Mepham et al.

(10) Patent No.: US 7,513,350 B2
(45) Date of Patent: Apr. 7, 2009

(54) CLUTCHES

(75) Inventors: Shaun Ewan Mepham, Banbury (GB); Robert John Barnes, Cannock (GB)

(73) Assignee: Ricardo Uk Limited, Sussex (GB)

( * ) Notice: Subject to any disclaimer, the term of this patent is extended or adjusted under 35 U.S.C. 154(b) by 245 days.

(21) Appl. No.: 10/556,371

(22) PCT Filed: May 13, 2004

(86) PCT No.: PCT/GB2004/002064

§ 371 (c)(1),
(2), (4) Date: Jul. 11, 2006

(87) PCT Pub. No.: WO2004/102020

PCT Pub. Date: Nov. 25, 2004

(65) Prior Publication Data

US 2007/0023250 A1 Feb. 1, 2007

(30) Foreign Application Priority Data

May 13, 2003 (GB) ................................. 0310969.1

(51) Int. Cl.
*F16D 48/04* (2006.01)
*F16D 25/0638* (2006.01)
(52) U.S. Cl. .................... 192/54.3; 192/86; 192/109 F; 192/85 AA
(58) Field of Classification Search ................ 192/52.4, 192/52.3, 56.31, 109 F, 85 AA, 86; 137/625.21–23
See application file for complete search history.

(56) References Cited

U.S. PATENT DOCUMENTS

| | | | |
|---|---|---|---|
| 2,799,375 A * | 7/1957 | Forster ................... | 192/85 AA |
| 3,155,040 A * | 11/1964 | Shurts et al. ................. | 417/223 |
| 3,929,211 A * | 12/1975 | Maddock .................... | 192/54.3 |
| 4,009,730 A | 3/1977 | Starling | |
| 4,069,843 A | 1/1978 | Chatterjea | |
| 4,335,745 A * | 6/1982 | Bouveret et al. ............ | 137/554 |
| 4,421,218 A | 12/1983 | Haight | |
| 5,058,626 A * | 10/1991 | Takaoka et al. ........ | 137/625.66 |
| 5,248,126 A * | 9/1993 | Pruss et al. ................. | 251/368 |

(Continued)

FOREIGN PATENT DOCUMENTS

DE    37 25 492    2/1989

(Continued)

Primary Examiner—Rodney H Bonck
Assistant Examiner—John V Ligerakis
(74) Attorney, Agent, or Firm—Cowan, Liebowitz & Latman

(57) ABSTRACT

A clutch including two rotary shafts, one of which is connected to one or more first clutch plates which cooperate with a second set of clutch plates, the clutch plates acted on by an actuating piston positioned within a two chamber hydraulic cylinder. A torque control valve comprising a cylindrical inner valve member rotatably and linearly movably received in a cylindrical opening in an outer valve member. Each valve member having elongate recesses positioned such that longitudinal movement of the inner valve member within the outer valve member will vary the degree of communication between the first and second elongate recesses connected to two hydraulic fluid sources of differing pressures. The second clutch plates are connected to one side of a spring of predetermined spring rate, which is also connected to one of the valve members, and the other side of the spring is connected to the other of the valve members and to the other rotary shaft.

11 Claims, 4 Drawing Sheets

U.S. PATENT DOCUMENTS

| | | | |
|---|---|---|---|
| 5,765,673 A * | 6/1998 | Nishiyama et al. | 192/85 AA |
| 5,791,447 A * | 8/1998 | Lamela et al. | 192/70.252 |
| 5,954,093 A * | 9/1999 | Leonard | 137/625.23 |
| 6,102,829 A * | 8/2000 | Muddell et al. | 477/77 |
| 6,196,369 B1 * | 3/2001 | Willert et al. | 192/85 R |
| 6,315,097 B1 | 11/2001 | Burns | |
| 7,210,376 B2 * | 5/2007 | Davidsson | 74/650 |

FOREIGN PATENT DOCUMENTS

| | | |
|---|---|---|
| JP | 61-130625 | 6/1986 |
| JP | 61-197825 | 9/1986 |

* cited by examiner

CLUTCHES

CROSS-REFERENCES TO RELATED APPLICATIONS

This application claims priority to International Application No. PCT/GB2004/002064 filed 13 May 2004, which claims priority to British application No. 0310969.1 filed 13 May 2003, the entire disclosure of which is hereby incorporated by reference.

BACKGROUND OF THE INVENTION

The present invention relates to clutches, particularly for automotive use, and is concerned with that type of clutch which may be controlled so that the torque which it transmits is at a predetermined level or alters in accordance with a predetermined pattern. The invention is particularly concerned with such clutches for use in connection with so-called manual automatic gearboxes.

Clutches for use with manual automotive gearboxes are inherently of torque controlled type but the torque control is effected by the user. Thus when the user releases the clutch to reconnect the engine output shaft to the gearbox after changing gear, he does so gradually so that the torque transmitted to the gearbox increases progressively to its maximum value. Gear changing is thus rendered smooth, whereas if the clutch were released suddenly gear changing would be accompanied by unacceptably jerky movement of the vehicle.

However, manual automotive gearboxes are gradually losing favour and being replaced by either automatic gearboxes or manual automatic gearboxes. Automatic gearboxes typically do not incorporate meshing pairs of gears, as are used in manual gearboxes, and their operation is generally inherently smooth. Manual automatic gearboxes, however, are generally similar to manual gearboxes and incorporate meshing pairs of gearwheels. When a gear change is to be effected, the clutch is automatically disengaged, e.g. hydraulically, and the gear selector fork moved, e.g. again hydraulically, and the clutch is then reengaged. As discussed above, in order to avoid unacceptable jerkiness, it is necessary for the clutch to be reengaged progressively and in known torque controlled clutches this is effected by applying a progressively increasing hydraulic pressure to the hydraulic actuating piston associated with the clutch plates. However, progressive hydraulic pressure control valves are very expensive. A complex feedback system is commonly used in an attempt to achieve a predetermined profile of the rate of increase of the torque transmitted by the clutch but these systems suffer from a lack of sophistication which results in practice in the gear change being unacceptably jerky.

It is therefore the object of the invention to provide a torque-control clutch, particularly for use with a manual automatic automotive gearbox which overcomes the problems referred to above and, in particular, does not incorporate a progressive hydraulic valve and enables smooth gear changes.

BRIEF SUMMARY OF THE INVENTION

According to the present invention, a clutch includes two rotary shafts, one of which is connected to one or more first clutch plates cooperating with one or more second clutch plates, the clutch plates being acted on by an actuating piston having a portion exposed on two opposite sides to first and second chambers in a hydraulic cylinder, a torque control valve comprising a cylindrical inner valve member rotatably and linearly movably received in a cylindrical opening in an outer valve member, the inner and outer valve members affording cooperating cylindrical surfaces, in one of which an elongate first recess is formed, which communicates with one of the said chambers, and in the other of which two circumferentially spaced elongate second recesses are formed communicating with a source of pressurised hydraulic fluid and a substantially unpressurised hydraulic reservoir, respectively, the elongate recesses extending in the longitudinal direction and in the same circumferential direction in the cylindrical surface in which they are formed and being positioned such that longitudinal movement of the inner valve member within the outer valve member will vary the degree of communication between the first and second elongate recesses, the second clutch plates being connected to one side of a spring of predetermined spring rate, which is connected also to one of the valve members, the other side of the spring being. connected to the other of the valve members and to the other rotary shaft.

The actuating piston for the clutch plates may be of either single-acting or double-acting type. If it is of single-acting type, one of the cooperating cylindrical surfaces in the valve will have a recess communicating with that chamber in the hydraulic cylinder which will act to force the piston in the direction to press the first and second clutch plates into engagement with one another. The other of the cooperating surfaces will have two recesses, one connected to the source of pressurised hydraulic fluid and the other connected to the unpressurised hydraulic reservoir. If it is desired to cause the clutch to engage, the inner valve member is moved linearly within the outer valve member so as to cause the recess communicating with the said hydraulic chamber to move progressively into communication with the recess in the other surface communicating with the source of pressurised hydraulic fluid. As the area of communication increases, the pressure in the hydraulic chamber will progressively increase and the clutch plates will be forced smoothly into engagement with one another. If the clutch plates should "snatch", that is to say suddenly come into hard engagement with one another, the torque transmitted by the clutch will abruptly increase substantially. This torque increase or "spike" will result in the spring yielding and since the two sides of the spring are connected to the valve members, this will result in relative rotation of the two valve members. This rotation is in the sense which will reduce the area of communication between the two said recesses and act to reduce the engagement pressure of the clutch plates and thus also the torque transmitted by the clutch. Since the spring is a mechanical component situated in the torque path, this feedback is both efficient and effectively instantaneous, whereby the torque "spike" is suppressed almost immediately after it commences. As the excessive torque reduces, the two valve members rotate in the opposite sense relative to one another and the progressive smooth engagement of the clutch plate continues, thereby ensuring a smooth gear change. When it is desired to disengage the clutch, the inner valve member is moved linearly in the opposite direction so as to bring the recess communicating with the previously pressurised hydraulic chamber into communication with the recess in the opposite surface communicating with the unpressurised hydraulic reservoir. The clutch plates then move apart and thus out of engagement, e.g. under the action of their natural resilience or the action of a return spring or the like.

If the actuating piston is of double-acting type, two elongate first recesses are formed in the said one cylindrical surface, which communicate with respective chambers, and three spaced elongate recesses are formed in the said other cylindrical surface, the central one of which is connected to the source of pressurised fluid and the other two of which are connected to the hydraulic reservoir. Operation of the valve to cause engagement of the clutch is essentially as described above. However, when the clutch is to be disengaged, the inner valve member is moved linearly so that the previously pressurised hydraulic chamber is connected to the unpressurised hydraulic reservoir and the previously unpressurised hydraulic chamber is connected to the source of pressurised hydraulic fluid, whereby the actuating piston is positively retracted and the clutch is thus positively disengaged as opposed to relying on resilience or a spring or the like, as in the single-acting construction.

Thus in the single-acting version there are three recesses and in the doubleacting version there are five recesses in the cooperating surfaces of the valve. It will, however, be appreciated that in each case the number of recesses could be larger than that mentioned, e.g. a multiple of that mentioned, for instance if the single valve is used to control two or more cooperating sets of clutch plates or if it is desired, for some reason, to duplicate the hydraulic supply and return passages.

In the preferred embodiment, the first recess(es) are formed in the outer valve member and the second recess(es) are formed in the inner valve member.

In a practical embodiment, the second clutch plates are connected to a hub or clutch body which is connected to the output shaft.

It is preferred that the torque control valve is received in an opening in the. clutch body and rotates with it. It is preferred also. that the source of pressurised hydraulic fluid comprises a pump which is mounted to rotate with the clutch body and includes a piston adapted to cooperate with a stationary track to be reciprocated thereby. The source of pressurised hydraulic fluid preferably communicates with the associated recess (es) via a passage which includes a hydraulic accumulator, e.g. of spring-loaded type.

The spring, which essentially constitutes a mechanical feedback element, may take a variety of forms but in the preferred embodiment it comprises one or more plate springs or corneal springs engaged on opposite sides by members connected to the inner and outer valve members, respectively, whereby a sudden increase in the torque transmitted through the engaging first and second clutch plates will result in yielding of the spring and thus relative rotation of the first and second valve members in a sense which reduces the hydraulic pressure acting to urge on the first and second clutch plates into engagement.

BRIEF DESCRIPTION OF THE DRAWINGS

Further features and details of the invention will be apparent from the following description of one specific embodiment of torque control clutch in accordance with the invention which is given by way of example with reference to the accompanying drawings, in which.

DETAILED DESCRIPTION

Figure 1:
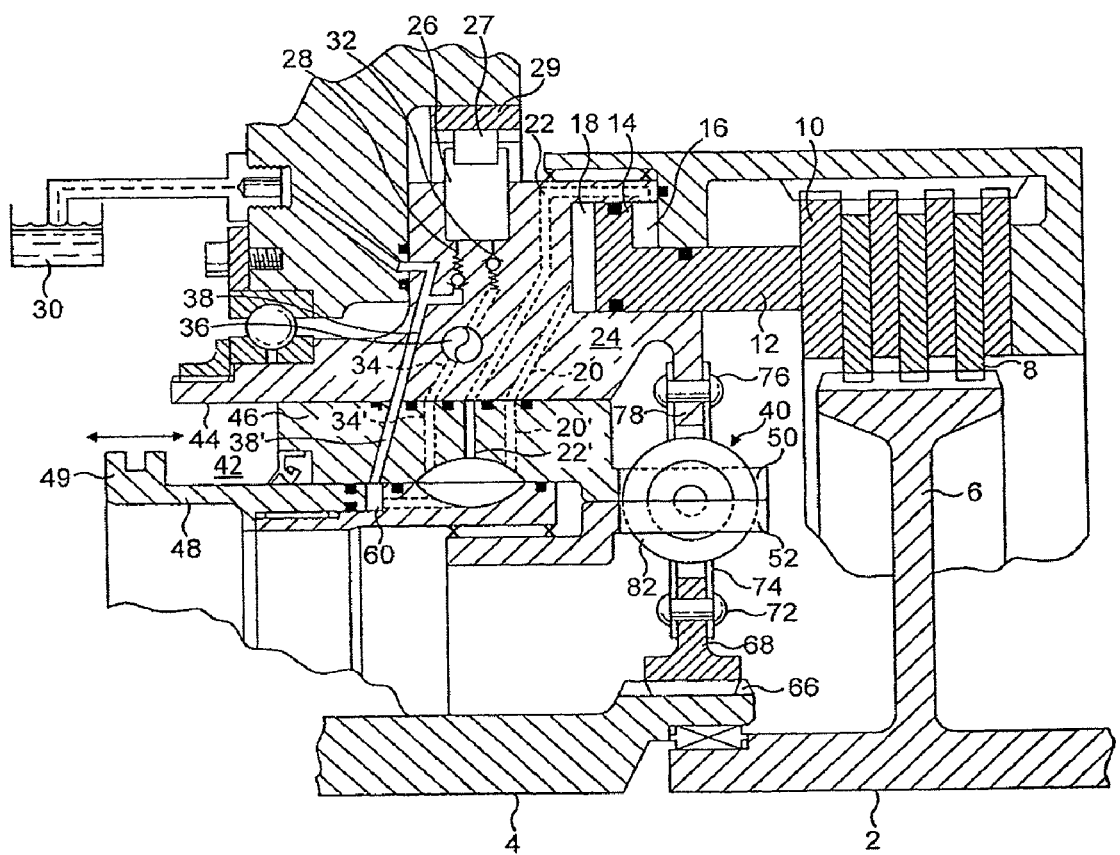
FIG. 1 is an axial sectional view of one half of the clutch.
Figure 2:
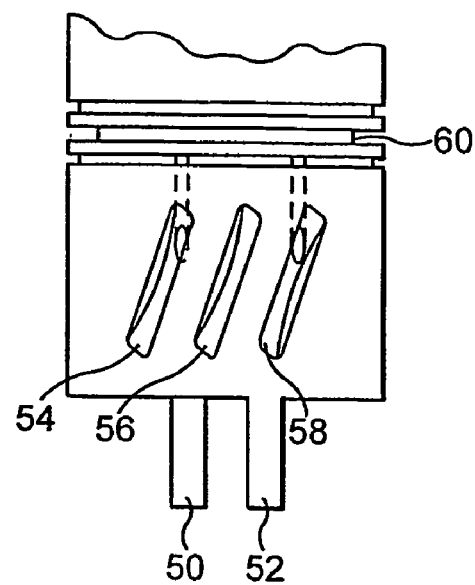
FIG. 2 is a plan view of the spool valve rotor.
Figure 3:
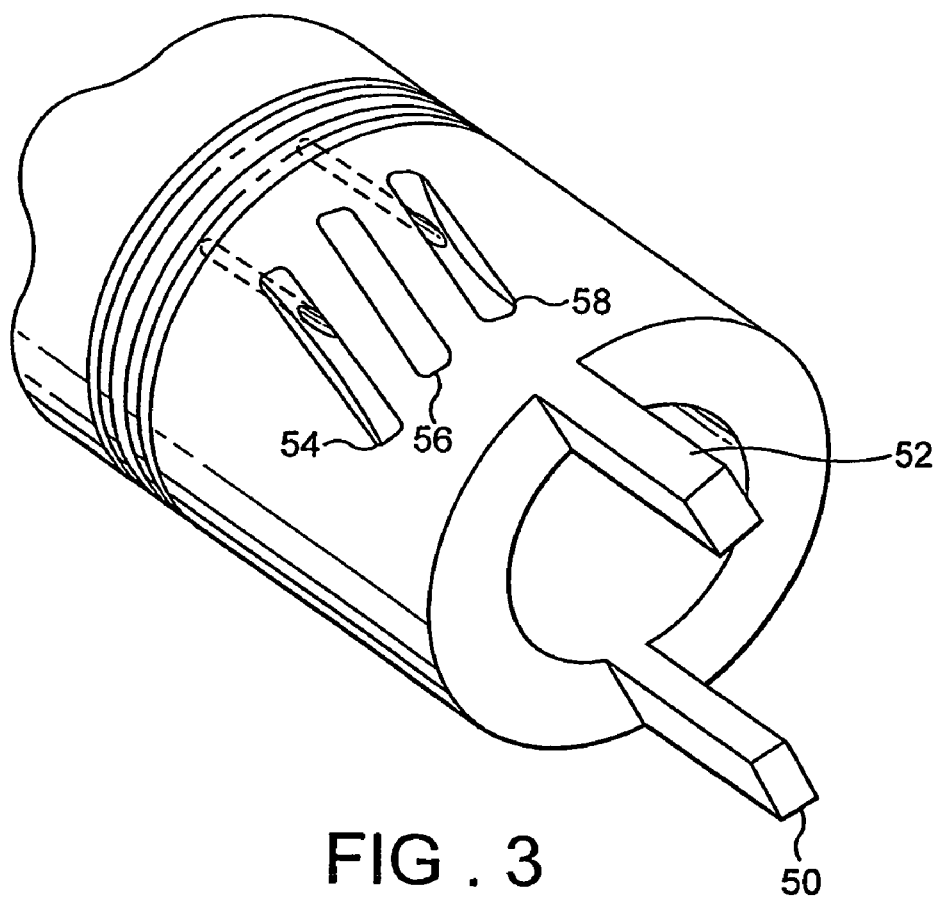
FIG. 3 is a perspective view of the spool valve rotor.

Referring firstly to FIG. 1, the clutch comprises an input shaft 2 and a coaxial output shaft 4. Meshing with a splined hub 6 carried by the input shaft 2 is a first set of annular clutch plates 8, which cooperate with a second set of annular clutch plates 10, which are connected to rotate with a clutch body 24. Cooperating with the outermost clutch plate 10 is a clutch piston 12, of which a portion 14 is received in a clutch cylinder, whose interior is divided into two chambers 16, 18 separated by the piston portion 14. The chambers 16, 18 communicate with respective hydraulic fluid supply passages 20, 22 extending within the clutch body 24. Also accommodated within the clutch body 24 is a high pressure hydraulic fluid pump 26, whose inlet 28 communicates via a non-return valve with an unpressurised tank or reservoir 30 of hydraulic fluid and whose outlet 32 communicates with a further hydraulic fluid supply line 34, which also extends within the clutch body 24 and includes a spring-loaded hydraulic accumulator 36. The pump 26 includes a piston 27 biased outwardly, e.g. by a spring, into sliding contact with an annular undulating stationary track 29. Also extending within the clutch body is a further hydraulic passage 38, which is connected to the tank 30. The clutch body 24 is connected via a feedback coupling 40, which will be described below, to the output shaft 4.

Formed in the clutch body 24 is a circular section cylindrical hole 42 with an internal surface 44. Located within the hole so as to rotate with the clutch body 24 is a hollow cylindrical spool 46, which forms the outer member of a spool valve. The hydraulic passages 20, 22, 34 and 38 all extend to the surface 44 and communicate with corresponding passages 20', 22', 34' and 38' formed in the spool 46. Rotatably and longitudinally slidably received in the outer spool 46 is an inner spool 48 which forms the inner member of the spool valve.

Formed at one end of the outer and inner spools 46, 48 and extending parallel to the axes of the spools are respective substantially diametrically opposed pairs of coupling members 50 and 52, whose function will be described below. The inner spool 48 extends out of the outer spool 46 and at the other end and at this end carries a spaced pair of circumferential flanges, which constitute an engagement area 49 for a linear actuator (not shown).

Figure 4:
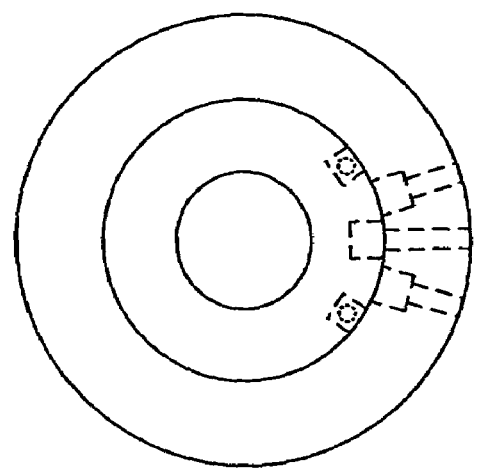
FIG. 4 is an end view of the spool valve.
Figure 5:
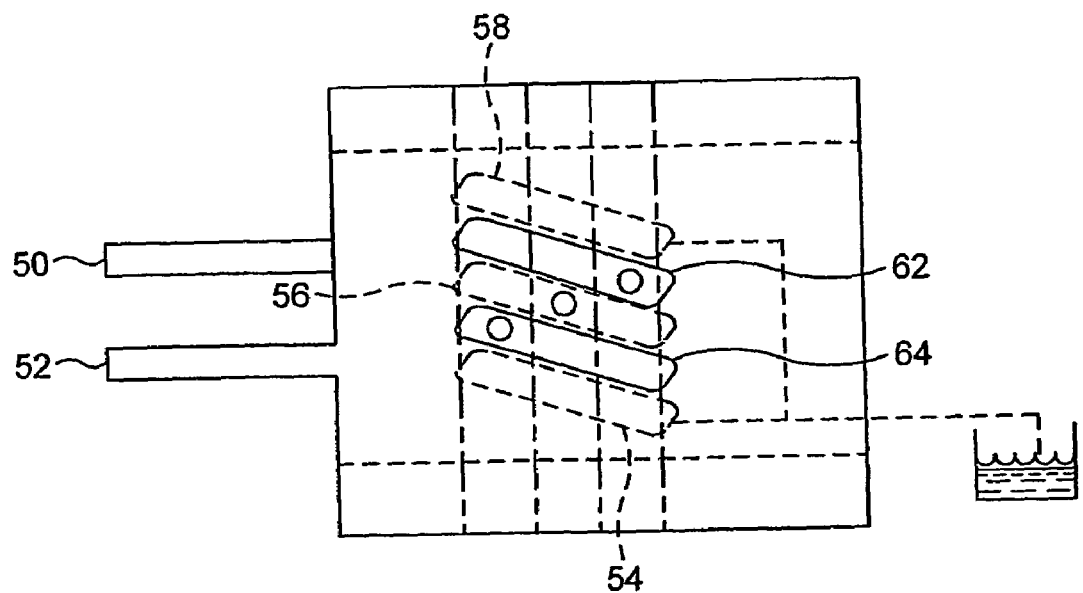
FIG. 5 is a diagrammatic view showing the relative positions of the cooperating ports in the spool valve, when in the neutral position.
Figure 6:
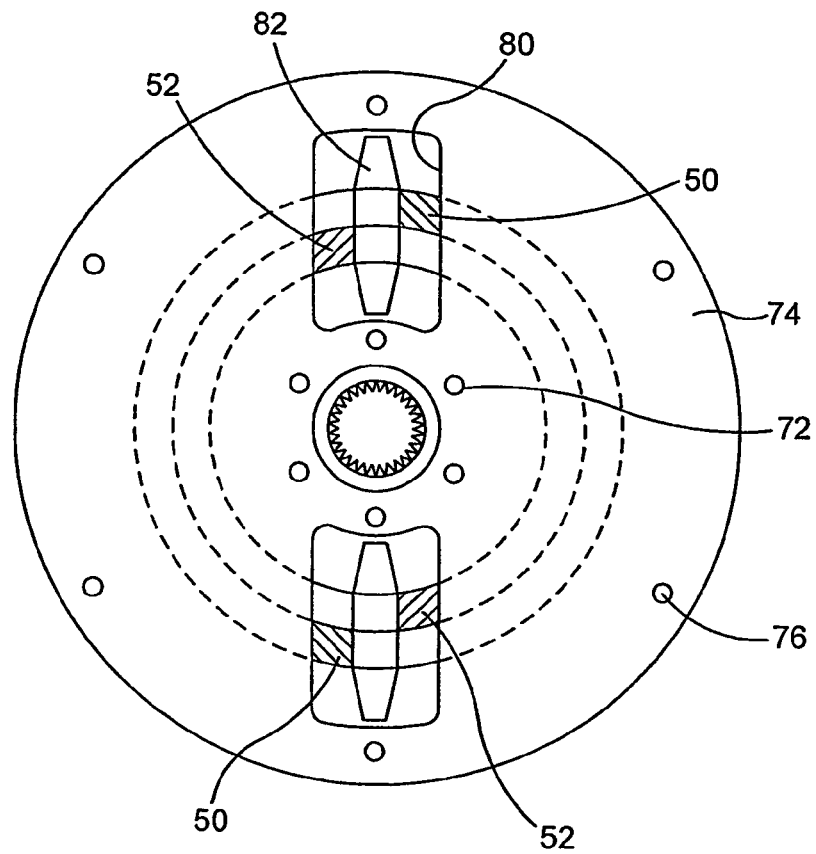
FIG. 6 is a view in the direction of the arrow 5 in FIG. 1 of the feedback connection between the output shaft and the spool valve.
Figure 7:
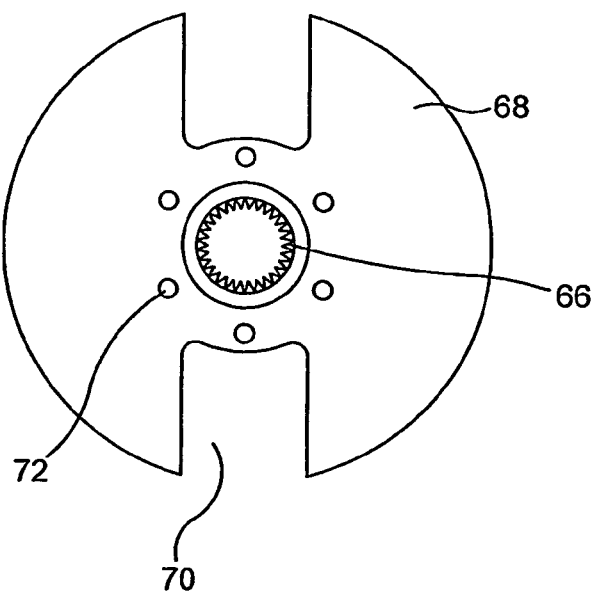
FIG. 7 is a scrap view of the output hub.

Formed in the outer surface of the inner spool 48 are three elongate, generally rectangular ports or recesses 54, 56, 58, which are spaced apart in the peripheral direction by a distance which is only slightly greater than their own width. The central recess 56 communicates with the passage 34' which is connected to the outlet of the pump 26. The two other recesses 54, 58 communicate via similar holes and passages with a circumferential groove 60 in the external surface of the inner spool 48, which in turn communicates with the passage 38' connected to the unpressurised tank 30. All three recesses 54, 56, 58 extend in the longitudinal direction and in the circumferential direction of the inner spool 48 and may thus be regarded as short helical ports. Formed in the inner surface of the outer spool 46 are two further similar short helical recesses 62, 64 which communicate with the hydraulic chambers 16, 18, respectively, via the passages 22', 20' and 22, 20, respectively. In the rest or neutral position of the spool valve, the various recesses are in the relative positions shown in FIG. 4 in which none of them communicate with one another.

Connected by a splined connection 66 to the output shaft 4 is a generally circular output hub 68, in whose outer periphery two diametrically opposed cut-outs 70 are formed. Connected to the outer surfaces of the hubs 68 by rivets or the like 72 are two. spaced parallel circular plates 74, whose outer edges are connected by further rivets or the like 76 to an inwardly extending flange 78 integral with the clutch body. Formed in the plates 74 are two holes 80, whose size and position correspond generally with those of the cut-outs 70 in the hubs 68. Extending through each hole 80 in one of the plates 74 into a respective cut-out 70 are one coupling member 50 and one coupling member 52, connected to the outer and inner spools, respectively. Each associated pair of coupling members 50,52 is spaced apart slightly in the radial direction and also in the circumferential direction. Sandwiched between them is a respective resilient Belleville washer 82. Each pair of coupling members 50, 52 is a close fit within the associated cut-out 70 in the hub 68. The inner and outer spool members 46, 48 are thus substantially constrained to rotate together by virtue of the forces transmitted between them through the coupling members 50, 52 via the interposed Belleville washers. Very slight relative rotation of the spool members 46, 48, i.e. of the order of a few degrees, is however possible if the torque applied between the clutch body 24 and the output shaft 4 through the hub 68 is sufficient to cause resilient yielding of the Belleville washers, thereby permitting slight relative temporary displacement of the associated coupling members 50, 52.

In use, when the clutch plates are in engagement, rotation is transmitted from the input shaft 2, through the clutch plates 8, 10 to the clutch body 24. The clutch body 24 and the spool valve thus rotate, carrying with them the hydraulic pump 26. The piston 27 on the pump thus moves along the stationary undulating track 29 causing it to oscillate radially and thus to produce pressurised hydraulic fluid, which is stored in part in the hydraulic accumulator 36. For this purpose, hydraulic fluid is drawn into the pump through its inlet 28 from the tank 30, which is stationary. All the numbered components shown in FIG. 1 thus rotate, with the exception of those numbered 29 and 30. The rotation of the clutch body 24 is transmitted via the flange 78 into the plates 74 and then to the hub 68 to the output shaft 4. Rotation, of the hub 68 is transmitted to the coupling members 50 or 52, depending on the direction of rotation of the hub 68, by virtue of their engagement with the surfaces of the cut-outs 70 and thence to the coupling members 52 or 50 through the Belleville washers. Under relatively low torque conditions, the Belleville washers remain substantially undeformed and the pairs of coupling members 50, 52 and thus the inner and outer spool valve members remain in their normal relative positions.

The clutch plates are engaged by the supply of pressurised hydraulic fluid to the chamber 18 which urges the piston 14, 12 to the right, as seen in FIG. 1, and thus squeezes the clutch plates 8, 10 together with sufficient contact pressure that torque is transmitted between them. Hydraulic pressure is applied to the chamber 18 by actuating the linear actuator to move the inner spool 48 linearly into the outer spool 46. This will result in the recesses in the cooperating surfaces of the spool valve members moving from the relative positions shown in FIG. 4 into a position in which the recess 56 will overlap with the recess 62 and the recess 54 will overlap with the recess 64. The hydraulic chambers 18 and 16 will thus be connected to high pressure and low pressure respectively and the piston 14, 12 will be urged to the right, as seen in FIG. 1. The linear actuator will move the inner spool inwards at a steady rate and this will result in a progressively increasing area of communication between the recesses 56 and 62 and thus, in the ideal case, in a smooth build up of pressure in the chamber 18 and thus a smooth engagement of the clutch plates, that is to say with no jerkiness. However, it can in practice not infrequently happen that the clutch plates do not move smoothly into engagement but "snatch" or "grab", that is to say suddenly engage. This results in a "spike" or sudden increase in the torque transmitted and it is such spikes which produce a jerky gear change. However, if such a torque spike should occur, the Belleville washers 82 in the feedback coupling will yield, thus causing relative rotation of the inner and outer spool members. This rotation is in the direction which reduces the degree of overlap of the recesses 62 and 56 and the rate of increase of pressure or the absolute value of the pressure in the chamber 16 is immediately reduced, thereby counteracting or suppressing the torque spike. Since the feedback is mechanical and effected by an element forming a part of the torque path, its effect is immediate and smooth engagement and disengagement of the clutch, whereby jerkiness or changing gear is eliminated.

When the clutch is to be released in order to permit a further gear change, the inner spool is moved outwardly until the recesses 62 and 58 come into registry and the recesses 64 and 56 come into registry also. The chambers 16 and 18 are then subjected to high and low pressure, respectively, and the piston is positively moved a short distance to the left, as seen in FIG. 1, and the clutch plates are disengaged.

It will be appreciated that numerous alterations may be made to the specific embodiment described above. It will be appreciated also that the clutch in accordance with the invention may have many applications other than merely in conjunction with a gearbox to facilitate gear changes. Thus it may be used e.g. to transmit a controllable amount of torque to an axle in a vehicle with an on-demand four wheel drive system or to transmit a controllable amount of torque between two wheels on a single axle. The clutch in accordance with the invention may thus be considered to be a variable torque transmission device or coupling.

The invention claimed is:

1. A clutch including two rotary shafts, one of which is connected to one or more first clutch plates cooperating with one or more second clutch plates, the clutch plates being acted on by an actuating piston having a portion exposed on two opposite sides to first and second chambers in a hydraulic cylinder, a torque control valve comprising a cylindrical inner valve member rotatably and linearly movably received in a cylindrical opening in an outer valve member, the inner and outer valve members affording cooperating cylindrical surfaces, in one of which an elongate first recess is formed, which communicates with one of the said chambers, and in the other of which two circumferentially spaced elongate second recesses are formed communicating with a source of pressured hydraulic fluid and a substantially unpressurized hydraulic reservoir, respectively, the elongate recesses extending in the longitudinal direction and in the same circumferential direction in the cylindrical surface in which they are formed and being positioned such that longitudinal movement of the inner valve member within the outer valve member will vary the degree of communication between the first and second elongate recesses, a spring of predetermined spring rate which provides direct mechanical feedback from the second clutch plate to the torque control valve through connections which include one side of the spring being connected to the second clutch plate and to one of the valve members, the other side of the spring being connected to the other of the valve members and to the other rotary shaft.

2. A clutch in claim 1 in which two elongate first recesses are formed in the said one cylindrical surface, which communicate with respective chambers, and three spaced elongate recesses are formed in the said other cylindrical surface, the central one of which is connected to the source of pressurized fluid and the other two of which are connected to the hydraulic reservoir.

3. A clutch as claimed in claim 2 in which the spring comprises one or more plate springs or conical springs engaged on opposite sides by members connected to the inner and outer valve members, respectively, whereby a sudden increase in the torque transmitted through the engaging first and second clutch plates will result in yielding of the spring and thus relative rotation of the first and second valve members in a sense which reduces the hydraulic pressure acting to urge on the first and second clutch plates into engagement.

4. A clutch as claimed in claim 1 in which the first recesses are formed in the outer valve member and the second recesses are formed in the inner valve member.

5. A clutch as claimed in claim 4 in which the spring comprises one or more plate springs or conical springs engaged on opposite sides by members connected to the inner and outer valve members, respectively, whereby a sudden increase in the torque transmitted through the engaging first and second clutch plates will result in yielding of the spring and thus relative rotation of the first and second valve members in a sense which reduces the hydraulic pressure acting to urge on the first and second clutch plates into engagement.

6. A clutch as claimed in claim 1 in which the second clutch plates are connected to a clutch body which is connected to the output shaft.

7. A clutch as claimed in claim 6 in which the torque control valve is received in an opening in the clutch body and rotates with it.

8. A clutch as claimed in claim 6 in which the source of pressurized hydraulic fluid comprises a pump which is mounted to rotate with the clutch body and includes a piston adapted to cooperate with a stationary track to be reciprocated thereby.

9. A clutch as claimed in claim 6 in which the source of pressurized hydraulic fluid communicates with the associated recess(es) via a passage which includes a hydraulic accumulator.

10. A clutch as claimed in claim 1 in which the spring comprises one or more plate springs or conical springs engaged on opposite sides by members connected to the inner and outer valve members, respectively, whereby a sudden increase in the torque transmitted through the engaging first and second clutch plates will result in yielding of the spring and thus relative rotation of the first and second valve members in a sense which reduces the hydraulic pressure acting to urge on the first and second clutch plates into engagement.

11. A clutch including two rotary shafts, one of which is connected to one or more first clutch plates cooperating with one or more second clutch plates, the clutch plates being acted on by an actuating piston having a portion exposed on two opposite sides to first and second chambers in a hydraulic cylinder, a torque control valve comprising a cylindrical inner valve member rotatably and linearly movably received in a cylindrical opening in an outer valve member, the inner and outer valve members affording cooperating cylindrical surfaces, in one of which an elongate first recess is formed, which communicates with one of the said chambers, and in the other of which two spaced elongate second recesses are formed communicating with a first source of hydraulic fluid at first pressure and a second source of hydraulic fluid at a second pressure, respectively, the second pressure being substantially lower than the first pressure, the elongate recesses extending in the longitudinal direction and in the same circumferential direction in the cylindrical surface in which they are formed and being positioned such that longitudinal movement of the inner valve member within the outer valve member will vary the degree of communication between the first and second elongate recesses, a spring of predetermined spring rate which provides direct mechanical feedback from the second clutch plate to the torque control valve through connections which include one side of the spring being connected to the second clutch plate and to one of the valve members, the other side of the spring being connected to the other of the valve members and to the other rotary shaft.

* * * * *